(No Model.)
W. E. KOCH.
AMALGAMATING APPARATUS.
No. 320,565. Patented June 23, 1885.
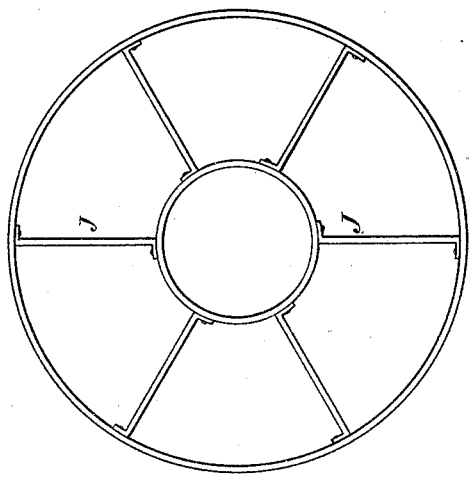
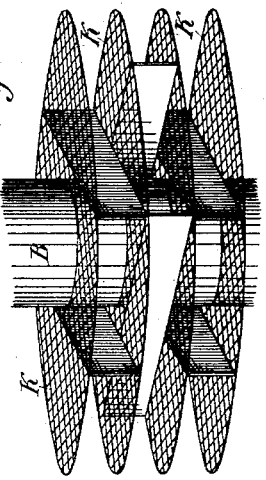
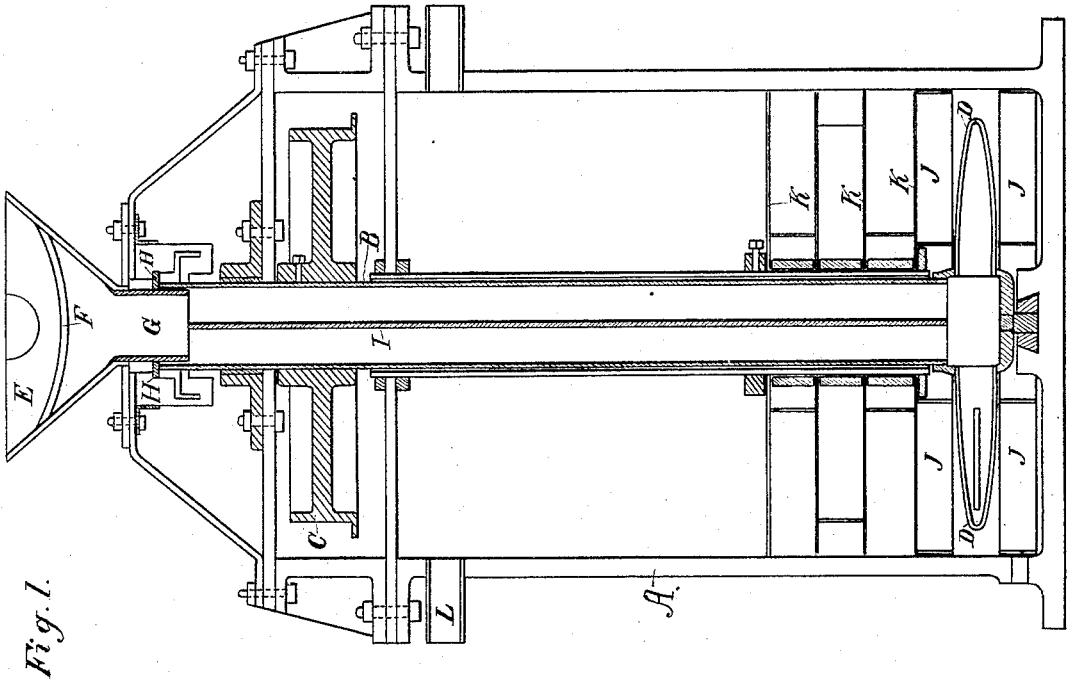
Witnesses:
Geo. H. Strong.
J. H. Nurse.
Inventor,
W. E. Koch
By Dewey & Co.
Attorneys

UNITED STATES PATENT OFFICE.

WALTER EDWARD KOCH, OF SOULSBYVILLE, CALIFORNIA.

AMALGAMATING APPARATUS.

SPECIFICATION forming part of Letters Patent No. 320,565, dated June 23, 1885.

Application filed April 20, 1885. (No model.)

*To all whom it may concern:*

Be it known that I, WALTER E. KOCH, of Soulsbyville, Tuolumne county, State of California, have invented an Improvement in Amalgamating Apparatus; and I hereby declare the following to be a full, clear, and exact description of the same.

My invention relates to an apparatus for separating particles of precious metals from pulverized ores or tailings by amalgamation; and it consists in certain details of construction, which will be more fully explained by reference to the accompanying drawings, in which—

Figure 1 is a vertical section taken through the apparatus. Fig. 2 is a view of the wings J. Fig. 3 is a view of the screen-disks.

In my present invention I have shown certain improvements in an apparatus which was patented to myself and A. K. Huntington, July 17, 1883, No. 281,629.

A is an exterior cylindrical vessel standing vertically, and having a hollow shaft, B, supported by a step at the bottom and a journal-box at the top, said shaft being caused to rotate by means of a belt acting upon a pulley, C, which is secured to it at a suitable point above the top of the vessel A. The lower end of the pipe B has arms D projecting from it of peculiar shape, and slotted, as shown in our former patent, so that by the rapid rotation of the shaft and these arms beneath the surface of a body of mercury a vacuum is formed, which causes the material fed to the shaft B to be discharged through the slots in the arms D, whence it rises through the mercury.

E is the feed-hopper, into which the material is placed, having a wire-gauze screen, F, fixed in it, the mesh of this screen being smaller than the slots in the discharge-arms. The nozzle G of this hopper extends downward into the pipe B, and a packing or collar, H, is fitted to form a joint between the two, so as to prevent any leakage inward of air, and a consequent imperfection in the vacuum which is produced by the revolution of the shaft and arms.

In order to insure the material being carried down, and to prevent the whirling motion of the mercury independent of the movement of the tube, a partition or diaphragm, I, extends vertically down the center of this tube, so that the material may pass down upon each side of it, escaping freely at the bottom.

Within the vessel A, and above and below the discharge-nozzle D, are fixed radial arms or plates J, which serve to retard and prevent the revolution and movement of the body of mercury within the vessel. Above these radial plates or wings are a series of perforated or screen disks, as shown at K, through which the material may rise gradually as it passes upward through the mercury until it reaches the surface.

L are the overflow-pipes through which the débris is discharged at pleasure as it accumulates within the chamber.

Having thus described my invention, what I claim as new, and desire to secure by Letters Patent, is—

1. In an amalgamating apparatus, a cylindrical vessel or chamber having the hollow vertical rotating pipe, the radial discharge-arms revolving beneath the body of mercury contained in the vessel, the feed-hopper discharging into the upper end of the pipe, as shown, in combination with a vertical partition or diaphragm extending from top to bottom of the pipe, substantially as herein described.

2. An amalgamating apparatus comprising a chamber having a vertical revolving pipe with a central diaphragm and tapering slotted branch pipes, a stationary hopper with a discharge-nozzle, a packing between the nozzle and revolving pipe, the perforated screens K, and the radial arms J, substantially as herein described.

In witness whereof I have hereunto set my hand.

WALTER EDWARD KOCH.

Witnesses:
C. D. COLE,
J. H. BLOOD.